(12) United States Patent
Palmer et al.

(10) Patent No.: US 7,242,490 B1
(45) Date of Patent: Jul. 10, 2007

(54) INTERNET PRINT MANAGING SYSTEM AND METHOD WITH PRINT JOB DISTRIBUTION

(75) Inventors: Donald J. Palmer, Eagle, ID (US); George Bradley Hobbs, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1210 days.

(21) Appl. No.: 09/685,847

(22) Filed: Oct. 10, 2000

(51) Int. Cl.
*G06F 15/00* (2006.01)

(52) U.S. Cl. .................................. 358/1.15; 358/1.13

(58) Field of Classification Search ............... 358/1.1, 358/1.5, 1.11, 1.12, 1.13, 1.14, 1.15, 400, 358/404, 407, 468, 1.9; 399/82, 84
See application file for complete search history.

(56) References Cited

U.S. PATENT DOCUMENTS

| | | | |
|---|---|---|---|
| 5,467,434 A * | 11/1995 | Hower et al. | 358/1.15 |
| 5,781,711 A | 7/1998 | Austin et al. | |
| 5,813,348 A | 9/1998 | Zingher | |
| 5,970,475 A | 10/1999 | Barnes et al. | 705/27 |
| 6,650,433 B1 * | 11/2003 | Keane et al. | 358/1.15 |

FOREIGN PATENT DOCUMENTS

WO    WO 00/03342    1/2000

OTHER PUBLICATIONS

European Search Report for Patent Application No. EP01109927. Search completed Jul. 13, 2005.

* cited by examiner

*Primary Examiner*—Kimberly A. Williams

(57) ABSTRACT

A system and method of managing print services provided by a print provider includes defining a network communication link between the print provider and a print managing system controller having the print services provided by the print provider registered therewith. The print managing system controller receives a job ticket for a print job and compares the job ticket with the print services provided by the print provider to determine if the print provider has the print services to fulfill the print job. If the print managing system controller determines that the print provider has the print services to fulfill the print job, the print managing system controller distributes the job ticket for the print job to the print provider via the network communication link.

39 Claims, 9 Drawing Sheets

INTERNET PRINT MANAGING SYSTEM AND METHOD WITH PRINT JOB DISTRIBUTION

CROSS-REFERENCE TO RELATED APPLICATIONS

This patent application is related to Non-Provisional U.S. patent application Ser. No. 09/686,849, entitled "INTERNET PRINT BROKERING SYSTEM AND METHOD", filed on Oct. 10, 2000, assigned to the assignee of the present invention, and incorporated herein by reference; Non-Provisional U.S. patent application Ser. No. 09/685,496, entitled "INTERNET PRINT MANAGING SYSTEM AND METHOD WITH PRINT SERVICES COST ACCOUNTING", filed on Oct. 10, 2000, assigned to the assignee of the present invention, and incorporated herein by reference; Non-Provisional U.S. patent application Ser. No. 09/686,007, entitled "INTERNET PRINT MANAGING SYSTEM AND METHOD WITH PRINT SERVICES STATISTICAL ANALYSIS", filed on Oct. 10, 2000, assigned to the assignee of the present invention, and incorporated herein by reference; Non-Provisional U.S. patent application Ser. No. 09/686,848, entitled "INTERNET PRINT MANAGING SYSTEM AND METHOD WITH PRINT SERVICES CONSUMABLES MANAGEMENT", filed on Oct. 10, 2000, assigned to the assignee of the present invention, and incorporated herein by reference; and Non-Provisional U.S. patent application Ser. No. 09/685,396, entitled "INTERNET PRINT MANAGING SYSTEM AND METHOD WITH PRINT SERVICES HARDWARE/SOFTWARE UPGRADE MANAGEMENT", filed on Oct. 10, 2000, assigned to the assignee of the present invention, and incorporated herein by reference.

THE FIELD OF THE INVENTION

The present invention relates generally to print services and, more particularly, to an Internet system and method of managing print services offered by a print provider.

BACKGROUND OF THE INVENTION

Typically, management of print services offered by a print provider is conducted by a person or persons deemed knowledgeable of the print services offered by the print provider. More specifically, the person or persons managing the print services of the print provider is charged with understanding the capabilities and/or limitations of the print services offered by the print provider, including equipment, materials, labor, and other resources of the print provider. In addition, the person or persons managing the print services of the print provider must also recognize the demands of print jobs presented to the print provider.

To ensure effective utilization of the print services of the print provider, the person managing the print services of the print provider must balance the capabilities of the print services with the demands of the print jobs and direct distribution of the print jobs accordingly. Unfortunately, the person managing the print services of the print provider may not be fully aware of available print jobs and/or the capability of print providers to fulfill the print jobs. Personal management of the print services of the print provider, therefore, may be ineffective and inefficient.

Accordingly, a need exists for automatically managing print services of a print provider such that the print services offered by the print provider are effectively utilized. More particularly, a need exists for efficiently distributing a print job to print providers such that use of the print services of the print providers are optimized.

SUMMARY OF THE INVENTION

One aspect of the present invention provides a method of managing print services provided by a print provider. The method includes defining a print managing system controller having the print services provided by the print provider registered therewith, defining a network communication link between the print provider and the print managing system controller, and receiving a job ticket for a print job at the print managing system controller. The method also includes determining via the print managing system controller if the print provider has the print services to fulfill the print job and distributing the job ticket for the print job to the print provider via the network communication link if the print managing system controller determines that the print provider has the print services to fulfill the print job. The step of determining if the print provider has the print services to fulfill the print job includes comparing the job ticket for the print job with the print services provided by the print provider.

Another aspect of the present invention provides a system for managing print services provided by a print provider. The system includes a print managing system controller configured to have the print services provided by the print provider registered therewith. As such, the print managing system controller is adapted to receive a job ticket for a print job and compare the job ticket with the print services provided by the print provider to determine if the print provider has the print services to fulfill the print job. Thus, the print managing system controller is adapted to distribute the job ticket for the print job to the print provider if the print managing system controller determines that the print provider has the print services to fulfill the print job.

In one embodiment, the present invention provides a system and method of managing print services offered by a print provider. The system and method utilizes a network communication link between the print provider and a controller of the system to efficiently and automatically distribute a print job to the print provider such that use of the print services of the print provider is optimized.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
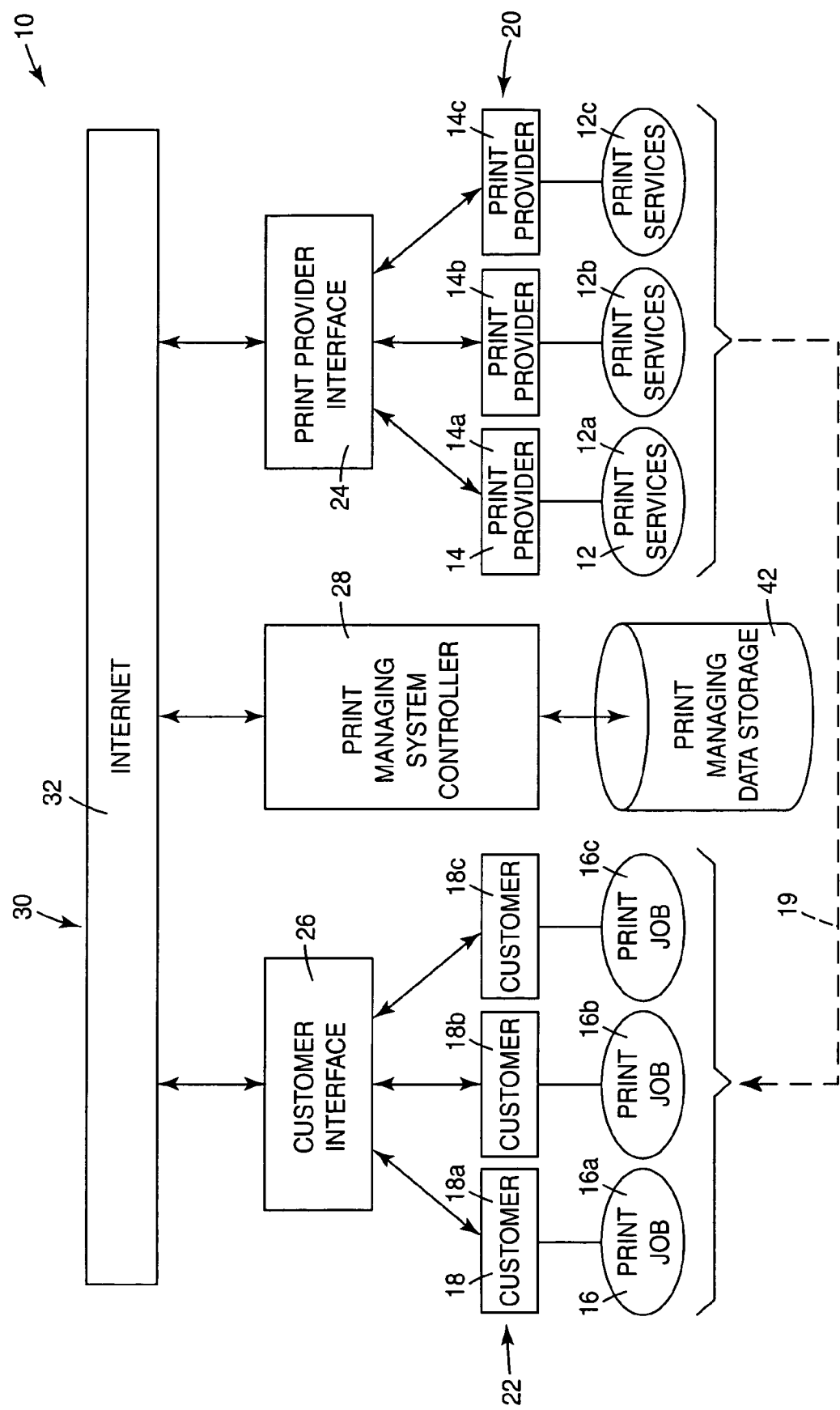
FIG. 1 is a block diagram illustrating one exemplary embodiment of a print managing system according to the present invention.

An Internet print managing system according to the present invention is illustrated generally at 10 in FIG. 1. Print managing system 10 automatically manages print services 12 offered by a print provider 14. In one exemplary embodiment, print managing system 10 automatically distributes a print job 16a, 16b, 16c created or specified by a customer 18a, 18b, 18c to at least one print provider 14a, 14b, 14c offering print services 12a, 12b, 12c, respectively. For clarity, print services 12a, 12b, 12c, print provider 14a, 14b, 14c, print job 16a, 16b, 16c, and customer 18a, 18b, 18c are referred to hereinafter as print services 12, print provider 14, print job 16, and customer 18, respectively. As such, print provider 14 may be one of a plurality of print providers 20 each providing separate print services 12. Customer 18 may be one of a plurality of customers 22 each having a separate print job 16.

Print services 12, as used herein, is defined to include printing services, finishing services, delivery services, and/or other print processing services including, for example, data conversion services. Print provider 14, as used herein, is defined to include an entity or entities offering, providing, and/or assisting in printing services, finishing services, delivery services, and/or other print processing services. Print job 16, as used herein, is defined to include a piece of work requiring production and/or reproduction of printed matter. Customer 18, as used herein, is defined to include an entity or entities such as a consumer, an employee, or another print provider requesting or soliciting printing services, finishing services, delivery services, and/or other print processing services.

In one exemplary embodiment, print managing system 10 includes a print provider interface 24, a customer interface 26, and a print managing system controller 28. Print provider interface 24, customer interface 26, and print managing system controller 28 communicate with each other via a network communication link 30. Network communication link 30, as used herein, is defined to include an Internet communication link, an Intranet communication link, or similar high-speed communication link. In one preferred embodiment, network communication link 30 includes an Internet communication link 32. While the following description only refers to Internet communication link 32, it is understood that the use of other network communication links is within the scope of the present invention.

In one exemplary embodiment, print providers 20, customers 22, and print managing system controller 28 are all located remote from each other (i.e., at different locations). Thus, communications between print providers 20 and print managing system controller 28, communications between customers 22 and print managing system controller 28, and communications between print providers 20 and customers 22 are conducted over Internet communication link 32. Preferably, customers 22 communicate with print managing system controller 28 via Internet communication link 32. It is, however, within the scope of the present invention for customers 22 to communicate with print managing system controller 28 in other manners (e.g., a direct connection).

Print managing system 10, including print managing system controller 28, can be implemented in hardware via a microprocessor, programmable logic device, or state machine, in firmware, or in software within a given device. In one aspect, at least a portion of the software programming is written in JAVA programming language, and each of the main components communicate via Internet communication link 32 using a communication bus protocol. For example, the present invention may or may not use a TCP/IP protocol suite for data transport. Other programming languages and communication bus protocols suitable for use with print managing system 10 will become apparent to those skilled in the art after reading the present application.

Print managing system controller 28 includes hardware, software, firmware, or a combination of these. In one preferred embodiment, print managing system controller 28 includes a computer server or other microprocessor based system capable of performing a sequence of logic operations. In addition, print managing system controller 28 can include a microprocessor embedded system/appliance incorporating tailored appliance hardware and/or dedicated single purpose hardware.

Figure 2:
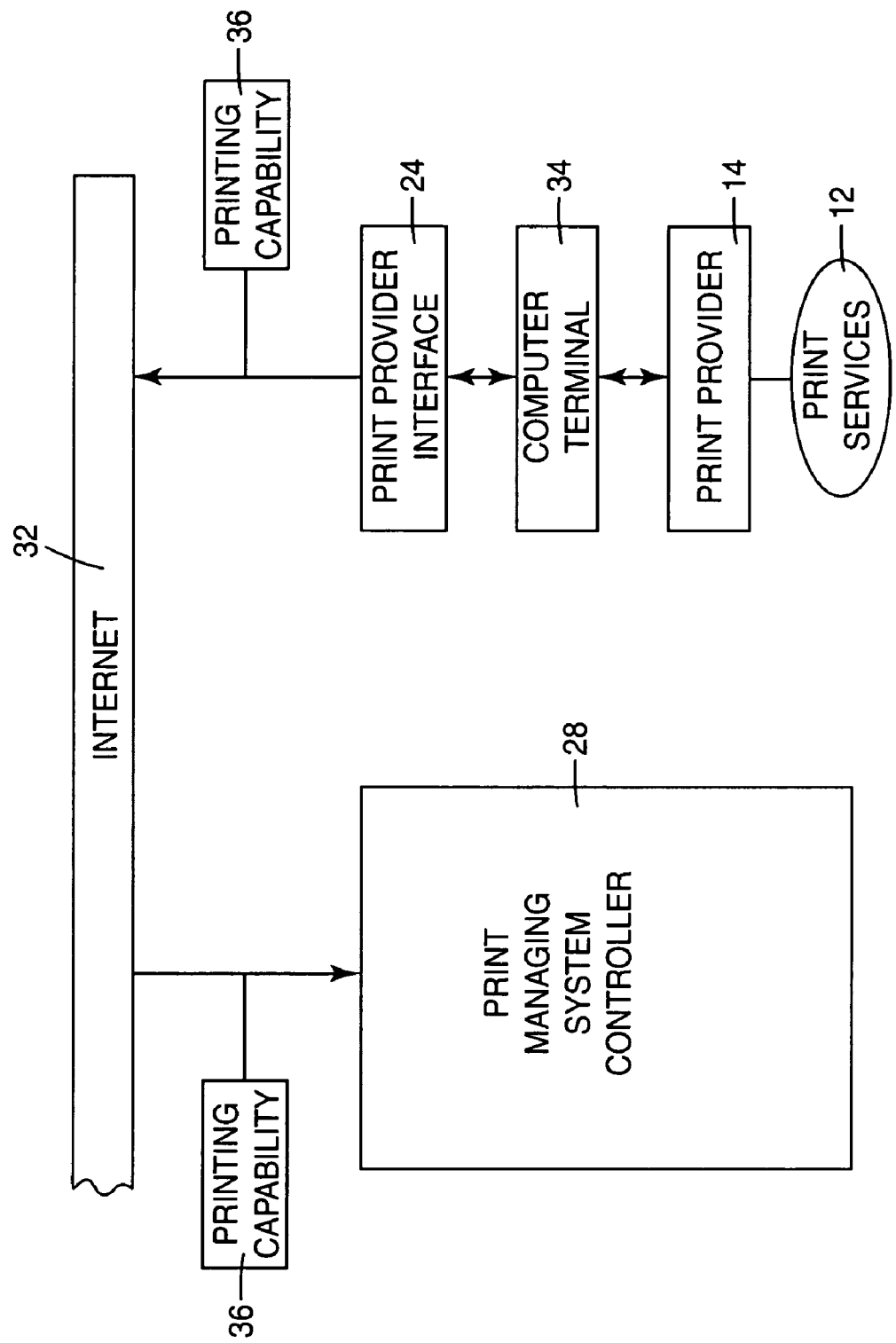
FIG. 2 is a block diagram illustrating one exemplary embodiment of information flow through a portion of the print managing system of FIG. 1.

As illustrated in FIG. 2, print provider 14 accesses print provider interface 24 of print managing system 10 via a computer terminal 34. Computer terminal 34 includes, for example, an input device such as a keyboard and/or a mouse and a display device such as a monitor, as is well known in the art. As such, print provider 14 interacts with print provider interface 24 via a computer terminal 34 to register a printing capability 36 with print managing system controller 28 via Internet communication link 32. Printing capability 36 identifies attributes of print services 12 provided by print provider 14, as described below.

Print provider 14 can re-register and/or update printing capability 36 with print managing system controller 28. If, for example, print provider 14 modifies print services 12 by adding, deleting, and/or upgrading equipment, components, and/or services, print provider 14 can re-register printing capability 36 with print managing system controller 28. In addition, if print provider 14 has excess capacity or, more specifically, the ability to take on additional work, print provider 14 can update printing capability 36 in print managing system controller 28.

Re-registering and/or updating of printing capability 36 with print managing system controller 28 can be performed manually by print provider 14 and/or automatically by print managing system controller 28 and the equipment or components being added, deleted, or upgraded. In one exemplary embodiment, print managing system controller 28 communicates with print provider 14 via Internet communication link 32 so as to monitor print services 12 and, more particularly, printing capability 36 of print provider 14. As such, print managing system controller 28 recognizes when equipment or components are added, deleted, or upgraded. Thus, printing capability 36 of print provider 14 is automatically updated by print managing system controller 28 when print services 12 of print provider 14 are modified or changed. Accordingly, print managing system 10 includes plug-and-play capabilities.

Figure 3:
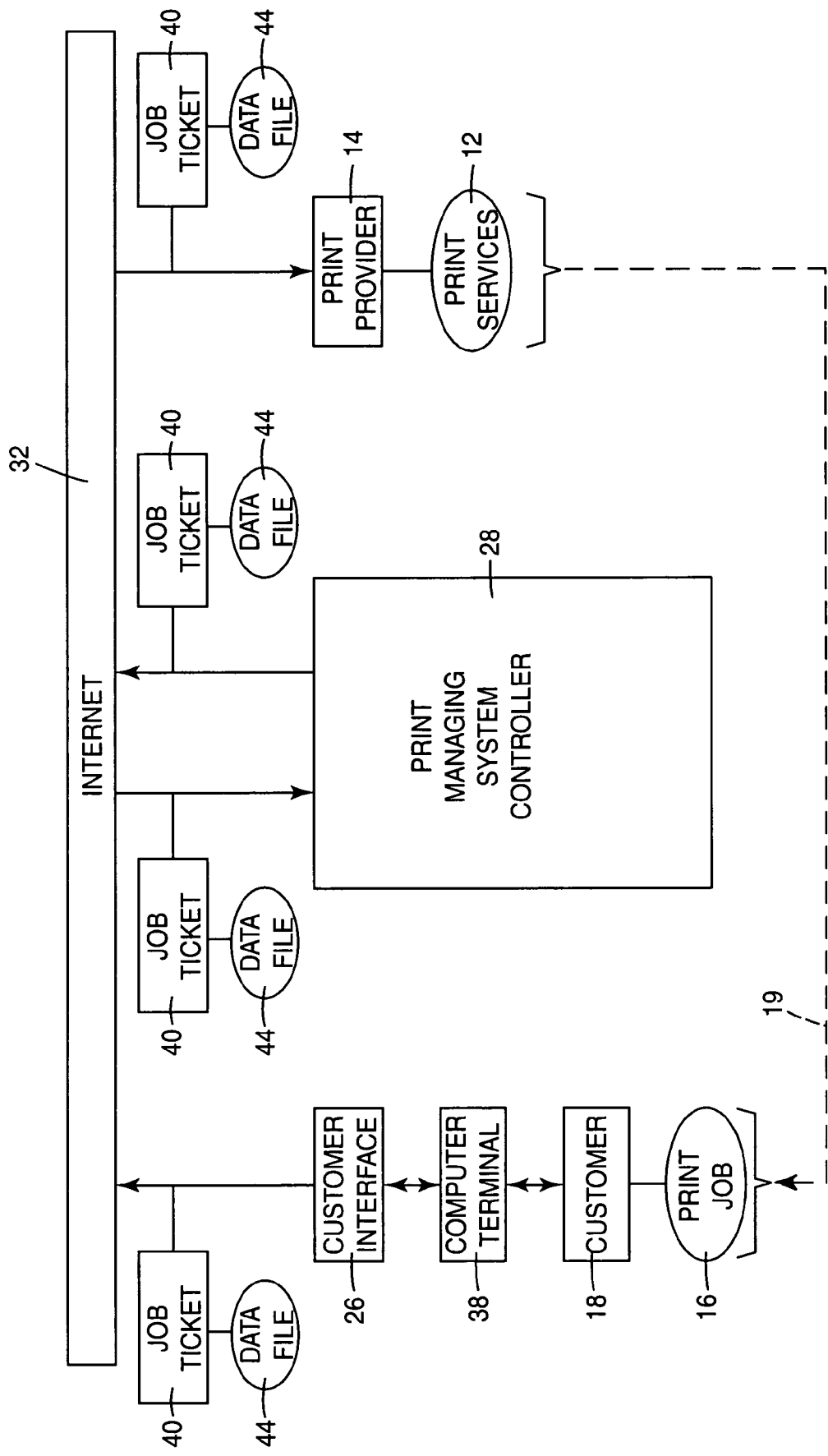
FIG. 3 is a block diagram illustrating one exemplary embodiment of information flow through another portion of the print managing system of FIG. 1.

As illustrated in FIG. 3, customer 18 accesses customer interface 26 of print managing system 10 via a computer terminal 38. Computer terminal 38 includes, for example, an input device such as a keyboard and/or a mouse and a display device such as a monitor, as is well known in the art. As such, customer 18 interacts with customer interface 26 via computer terminal 38 to generate a job ticket 40 for print job 16 and submit job ticket 40 to print managing system controller 28 via Internet communication link 32. Job ticket 40 identifies attributes of print job 16 as specified by customer 18. Job ticket 40, as used herein, is defined to include a list and/or a description of a piece of work requiring production and/or reproduction of printed matter. One exemplary embodiment of job ticket 40 is described in detail later in this specification.

Print managing system controller 28 receives job ticket 40 from customer 18, processes job ticket 40, and distributes job ticket 40 to print provider 14. Thus, print services 12 of print provider 14 interact with job ticket 40 to extract information for completing print job 16. As such, print provider 14 completes print job 16 and delivers completed print job 16 to customer 18. Delivery of completed print job 16 to customer 18 from print provider 14 is represented by dashed line 19.

In one exemplary embodiment, a status of print job 16 is tracked by job ticket 40 which customer 18 can access via customer interface 26 and Internet communication link 32 and print provider 14 can access via print provider interface 24 and Internet communication link 32. As such, configuration of job ticket 40, including which information is accessible, may be tailored specifically to customer 18 or print provider 14. Customer 18 and print provider 14 can interact with job ticket 40 via computer terminal 38 and computer terminal 34, respectively, or an appliance such as a Personal Digital Assistant (PDA).

Customer 18 also interacts with customer interface 26 to register with print managing system 10 as well as submit billing and shipping information to print managing system 10. Registering with print managing system 10 includes, for example, establishing an account by entering a user name and a user password. Submitting billing and shipping information to print managing system 10 includes, for example, submitting payment information such as a credit card or other account information and delivery information such as a shipping address.

In one exemplary embodiment, as illustrated in FIG. 1, print managing system 10 includes a print managing data storage system 42. Print managing data storage system 42 constitutes a database of one or more data files for print managing system 10. Examples of print managing data storage system 42 include non-volatile memory (e.g., a hard disk drive or other persistent storage device) and may include volatile memory (e.g., random access memory (RAM)). Data is transferred to and from print managing data storage system 42 via print managing system controller 28.

In one exemplary embodiment, print managing system controller 28 communicates with and transfers printing capability 36 of print providers 20 to print managing data storage system 42. As such, print managing data storage system 42 stores printing capability 36 of print providers 20 for subsequent retrieval and processing. More specifically, when print managing system controller 28 receives printing capability 36 from print provider 14, printing capability 36 is stored as a data file in print managing data storage system 42. Print managing system controller 28, therefore, subsequently retrieves printing capability 36 from print managing data storage system 42 for processing.

In one exemplary embodiment, as illustrated in FIG. 3, a data file 44 for print job 16 is associated with job ticket 40. Thus, data file 44 of print job 16 is submitted with job ticket 40 and uploaded to print managing system controller 28 via Internet communication link 32. As such, print managing system controller 28 stores data file 44 of print job 16 in print managing data storage system 42 for subsequent downloading to print provider 14.

When print managing system controller 28 distributes job ticket 40 to print provider 14, print managing system controller 28 also distributes data file 44 to print provider 14. Data file 44, therefore, is downloaded from print managing data storage system 42 and distributed to print provider 14 via Internet communication link 32. Thus, print job 16, including job ticket 40 and data file 44, is submitted to print provider 14 through print managing system controller 28. It is, however, within the scope of the present invention for data file 44 to be submitted directly to print provider 14 from customer 18.

Figure 4:
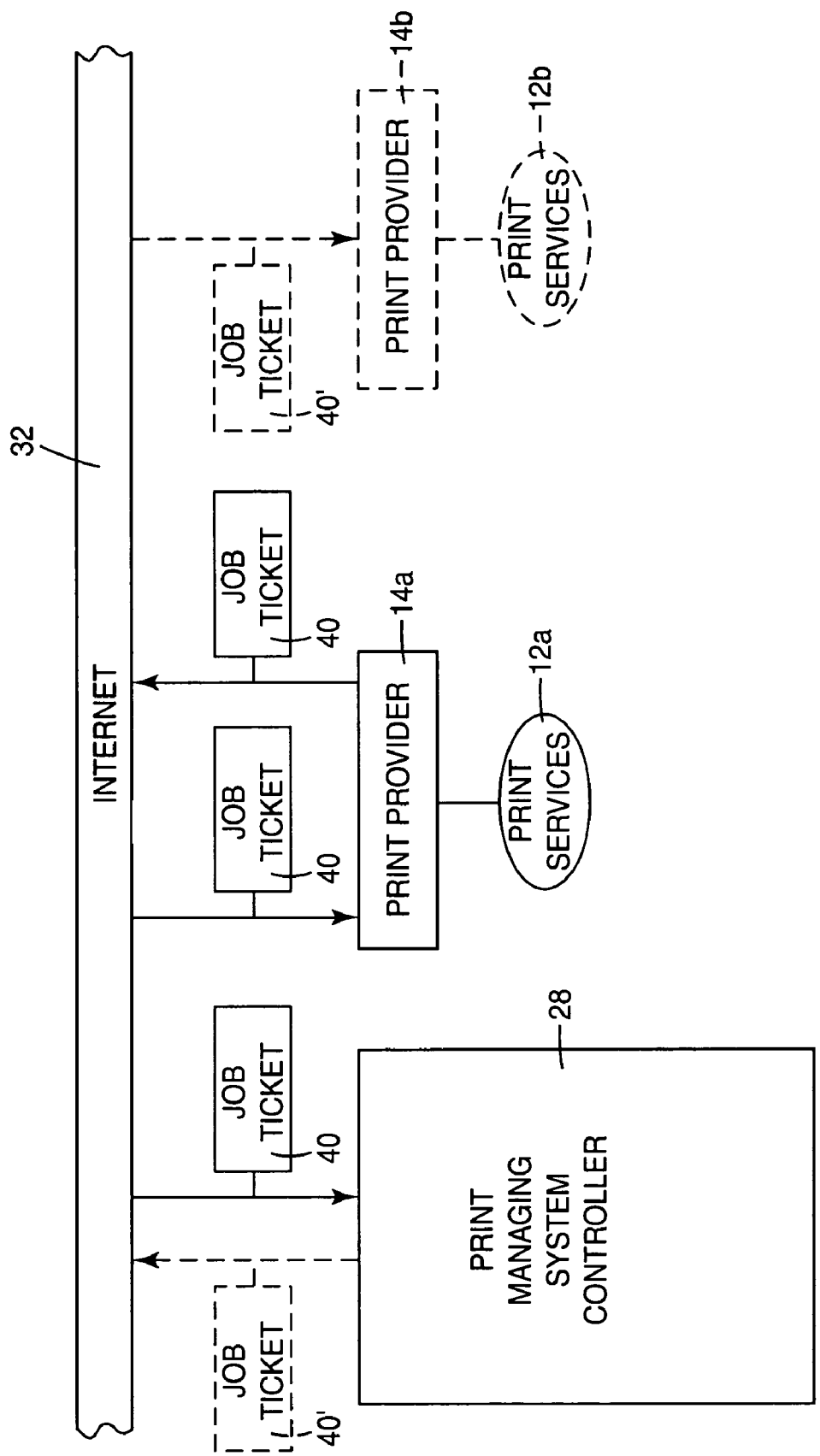
FIG. 4 is a block diagram illustrating one exemplary embodiment of information flow through another portion of the print managing system of FIG. 1.

In one exemplary embodiment, as illustrated in FIG. 4, print managing system controller 28 redistributes job ticket 40 when print provider 14 is unable to fulfill print job 16, either wholly or partially. Print provider 14 may be unable to fulfill print job 16 if, for example, print provider 14 underestimated an ability to complete print job 16 and/or accepted print job 16 with an intention of subcontracting all or part of print job 16 to another print provider 14. Thus, print provider 14 can transfer job ticket 40 and, therefore, print job 16 to another print provider 14.

In one illustrative embodiment, print managing system controller 28 initially distributes job ticket 40 to print provider 14*a* offering print services 12*a*. If, however, print provider 14*a* is unable to complete print job 16, either wholly or partially, job ticket 40 is resubmitted to print managing system controller 28. Thus, print managing system controller 28 reprocesses job ticket 40 and redistributes job ticket 40 as a job ticket 40'. Job ticket 40' (which may include data file 44) is redistributed to another print provider 14, such as print provider 14*b* offering print services 12*b*. Print provider 14*b*, therefore, completes, either wholly or partially, print job 16.

Figure 5:
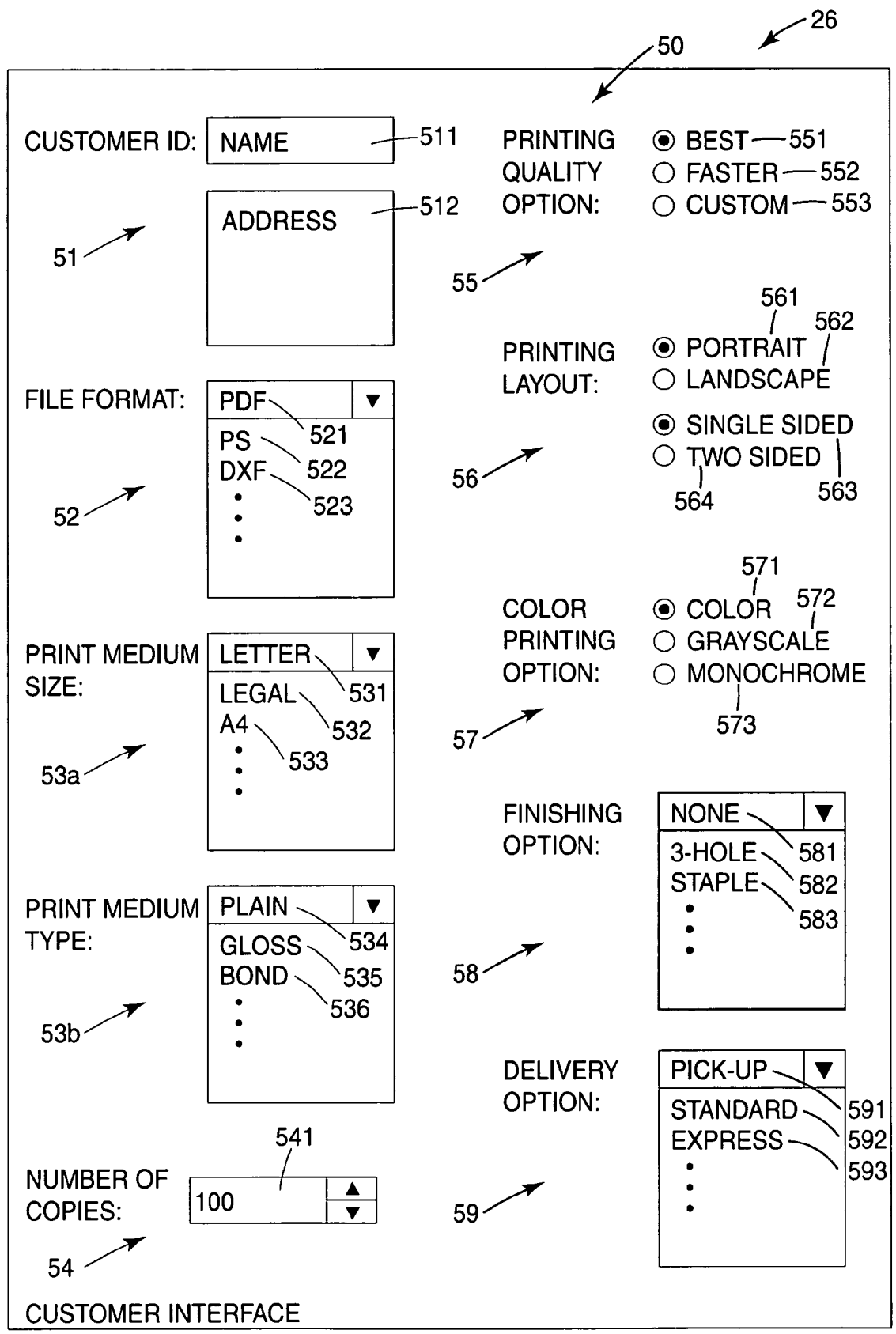
FIG. 5 is a diagram illustrating one exemplary embodiment of a portion of a customer interface of the print managing system of FIG. 1.

For print provider 14 to register printing capability 36 and customer 18 to create job ticket 40, print provider 14 interacts with print provider interface 24 and customer 18 interacts with customer interface 26, respectively. In one exemplary embodiment, as illustrated in FIG. 5, a portion of customer interface 26 includes a plurality of input fields 50 with which customer 18 interacts to specify attributes of print job 16. As such, customer 18 interacts with input fields 50, via an input device such as a keyboard and/or a mouse of computer terminal 38 or an appliance such as a Personal Digital Assistant (PDA), scanner, camera, etc., to generate job ticket 40 for print job 16.

Input fields 50 include, for example, a customer identification field 51, a file format field 52, a print medium size field 53*a*, a print medium type field 53*b*, a number of copies field 54, a printing quality option field 55, a printing layout field 56, a color printing option field 57, a finishing option field 58, and a delivery option field 59. Input fields 50 each include at least one subfield providing data entry points or representing available options for generating and submitting job ticket 40.

Customer identification field 51 includes, for example, subfields 511 and 512 which provide data entry points for a name and an address, respectively, of customer 18. File format field 52 includes, for example, subfields 521, 522, 523 which represent different file formats for print job 16. Print medium size field 53a includes, for example, subfields 531, 532, 533 which represent different sizes of print medium for print job 16. Print medium type field 53b includes, for example, subfields 534, 535, 536 which represent different types of print medium for print job 16. Number of copies field 54 includes subfield 541 in which a number of copies included in print job 16 is specified. Printing quality option field 55 includes, for example, subfields 551, 552, and 553 which represent different printing qualities, including different printing resolutions such as 1200 dpi, 600 dpi, 300 dpi, etc., for print job 16. Printing layout field 56 includes, for example, subfields 561, 562, 563, and 564 which represent different printing layouts for print job 16. Color printing option field 57 includes, for example, subfields 571, 572, and 573 which represent different color printing options for print job 16. Finishing option field 58 includes, for example, subfields 581, 582, 583 which represent different finishing options for print job 16. Delivery option field 59 includes, for example, subfields 591, 592, 593 which represent different delivery options and turnaround times for print job 16.

Additional file formats, print medium sizes, print medium types, printing quality options, printing layouts, color printing options, finishing options, and delivery options, as are well known in the art, may be represented by additional subfields of file format field 52, print medium size field 53a, print medium type field 53b, printing quality option field 55, printing layout field 56, color printing option field 57, finishing option field 58, and delivery option field 59, respectively. Selecting and/or completing various subfields of input fields 50, therefore, identifies attributes of print job 16 as specified by customer 18.

In one illustrative embodiment of customer interface 26, subfields 521, 522, and 523 of file format field 52 represent a Portable Document Format (.PDF), a PostScript (.PS) format, and an AutoCAD Interchange File (.DXF) format, respectively. Selecting subfield 521, therefore, identifies the file from which print job 16 is to be printed as a Portable Document Format (.PDF) file. Subfields 531, 532, and 533 of print medium size field 53a represent a Letter size, a Legal size, and an A4 size of print medium, respectively. Selecting subfield 531, therefore, identifies the size of print medium upon which print job 16 is to be printed as Letter. Subfields 534, 535, and 536 of print medium type field 53b represent a Plain, a Gloss, and a Bond type of print medium, respectively. Selecting subfield 534, therefore, identifies the type of print medium upon which print job 16 is to be printed as Plain. Subfields 551, 552, and 553 of printing quality option field 55 represent a Best, a Faster, and a Custom print quality, respectively. Selecting subfield 551, therefore, identifies the Best print quality for print job 16. Subfields 561, 562, 563, and 564 of printing layout field 56 represent an orientation of print job 16 including Portrait and Landscape and an imposition of print job 16 including Single-Sided and Double-Sided, respectively. Selecting subfields 561 and 563, therefore, identifies the orientation and the imposition of print job 16 as Portrait and Single-Sided, respectively. Subfields 571, 572, and 573 of color printing option field 57 represent Color Printing, Grayscale Printing, and Monochrome Printing, respectively. Selecting subfield 571, therefore, identifies Color Printing for print job 16. Subfields 581, 582, and 583 of finishing option field 58 represent No Finishing, 3-Hole Finishing, and Staple Finishing, respectively. Selecting subfield 581, therefore, identifies no finishing option for print job 16. Subfields 591, 592, and 593 of delivery option field 59 represent Pick-up, Standard Delivery, and Express Delivery, respectively. Selecting subfield 591, therefore, identifies customer pick-up of print job 16.

In one exemplary embodiment, input fields 50 include specific equipment and/or specific services which customer 18 can select for print job 16. Specific equipment includes, for example, specific printing equipment or finishing equipment. Specific services include, for example, predefined types of print jobs such as business cards, leaflets, posters, etc. As such, specific subfields may be automatically selected and/or completed when customer 18 selects specific equipment and/or specific services. When customer 18 selects specific printing equipment, for example, printing quality and color printing options may be automatically selected. When customer 18 selects a predefined type of print job such as business cards, for example, print medium size and printing layout options may be automatically selected.

In one exemplary embodiment, input of specific input fields 50 dictates a selection of other input fields 50. When customer 18 selects a specific subfield, for example, additional subfields may appear and/or existing subfields may be unavailable. In addition, when customer 18 selects a specific subfield, additional subfields may be automatically selected and/or completed. Furthermore, customer 18 may store preferences of various subfields as common default selections.

In one exemplary embodiment, print provider 14 may also interact with job ticket 40 to input comments and/or instructions necessary for fulfilling print job 16. As such, specific input fields 50 are accessible by both customer 18 and print provider 14. Other input fields 50, however, are accessible only by customer 18 or only by print provider 14.

Figure 6:
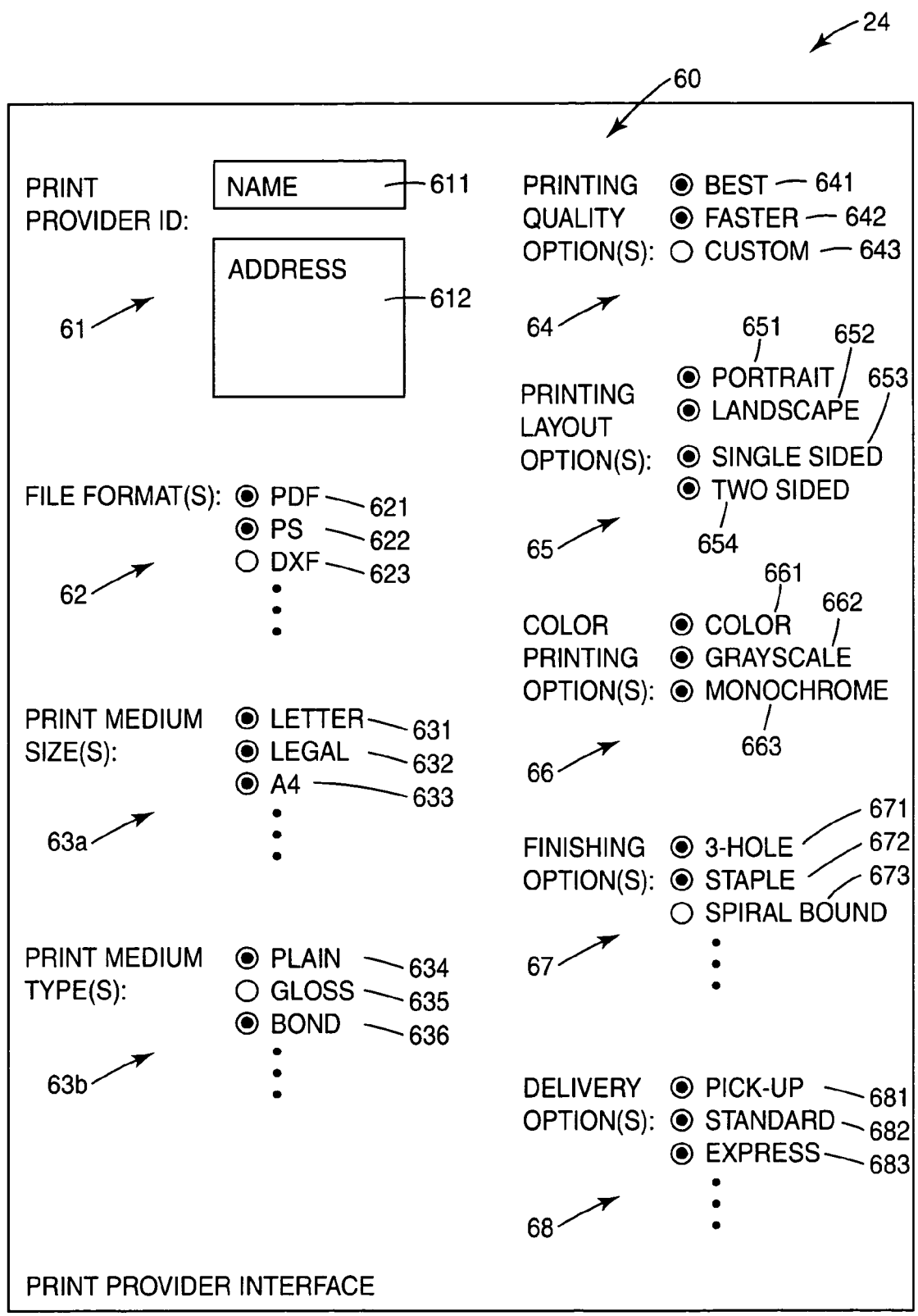
FIG. 6 is a diagram illustrating one exemplary embodiment of a portion of a print provider interface of the print managing system of FIG. 1.

In one exemplary embodiment, as illustrated in FIG. 6, a portion of print provider interface 24 includes a plurality of input fields 60 with which print provider 14 interacts to specify attributes of print services 12. Print provider 14 interacts with input fields 60, via an input device such as a keyboard and/or a mouse of computer terminal 34, to register printing capability 36. Input fields 60 include, for example, a print provider identification field 61, a file format options field 62, a print medium size options field 63a, a print medium type options field 63b, a printing quality options field 64, a printing layout options field 65, a color printing options field 66, a finishing options field 67, and a delivery options field 68. Input fields 60 each include at least one subfield providing data entry points or representing available options for registering printing capability 36.

Print provider identification field 61 includes, for example, subfields 611 and 612 which provide data entry points for a name and an address, respectively, of print provider 14. File format options field 62 includes, for example, subfields 621, 622, 623 which represent different file formats that print provider 14 supports and, more specifically, file formats from which print provider 14 is capable of printing. Print medium size options field 63a includes, for example, subfields 631, 632, 633 which represent different sizes of print medium upon which print provider 14 is capable of printing. Print medium type options field 63b, includes, for example, subfields 634, 635, 636 which represent different types of print medium upon which print provider 14 is capable of printing. Print quality options field 64 includes, for example, subfields 641, 642, and 643 which represent different printing qualities that print provider 14 is capable of offering as print services 12. Printing layout options field 65 includes, for example, subfields 651, 652, 653, and 654 which represent different printing layouts that print provider 14 is capable of providing as print services 12. Color printing options field 66 includes, for example, subfields 661, 662, and 663 which represent different color printing options that print provider 14 is capable of offering as print services 12. Finishing options field 67 includes, for example, subfields 671, 672, 673 which represent different finishing options that print provider 14 is capable of providing as printing services 12. Delivery options field 68 includes, for example, subfields 681, 682, 683 which represent different delivery options that print provider 14 is capable of providing as print services 12.

Additional file formats, print medium sizes, print medium types, printing quality options, printing layout options, color printing options, finishing options, and delivery options, as are well known in the art, may be represented by additional subfields of file format options field 62, print medium size options field 63a, print medium type options field 63b, printing quality options field 64, printing layout options field 65, color printing options field 66, finishing options field 67, and delivery options field 68, respectively. Selecting and/or completing various subfields of input fields 60, therefore, identifies attributes of print services 12 as provided by print provider 14 in a manner similar to how selecting and/or completing various subfields of input fields 50 identifies attributes of print job 16 as specified by customer 18. Print provider 14, however, may select and/or complete multiple subfields within each input field 60 to specify the different options available with print services 12.

In one exemplary embodiment, when print provider 14 selects a specific subfield, print provider 14 may also select other subfields per the specific subfield. When print provider 14 selects a specific print medium type, for example, print provider 14 may also select various print medium sizes per the specific print medium type. In addition, print provider 14 may specify or select a range of various subfields for a specific input field 60.

It is to be understood that FIGS. 5 and 6 are simplified illustrations of one exemplary embodiment of customer interface 26 and print provider interface 24, respectively. The illustrative presentation of input fields 50 and 60 including the respective subfields, for example, has been simplified for clarity of the invention. The subfields may be presented, for example, as open fields, pulldown menus, toggle selections, and/or highlighted or framed selections. In addition, customer interface 26 and/or print provider interface 24 may be presented, for example, in one or more screens or views. Furthermore, customer 18 and/or print provider 14 may generate job ticket 40 and register printing capability 36 by responding to query-based systems or applications. It is understood that such alternatives are within the scope of the present invention.

Figure 7:
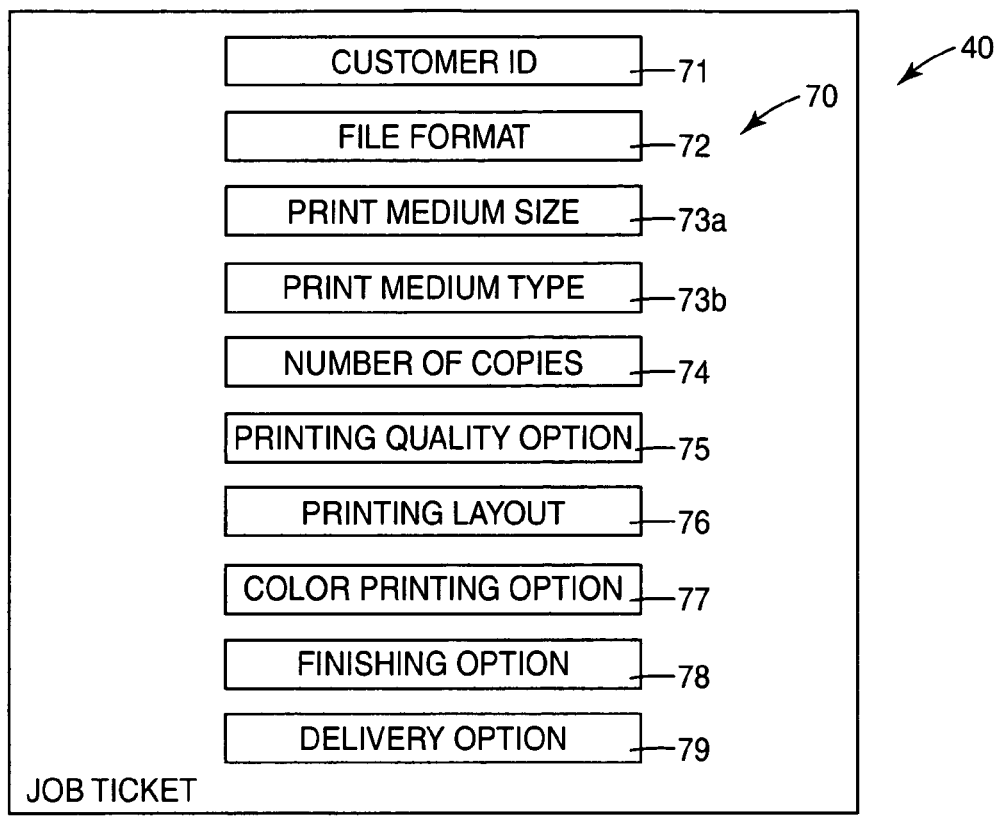
FIG. 7 is a diagram illustrating one exemplary embodiment of a job ticket for a print job received by the print managing system of FIG. 1.

By interacting with customer interface 26 and print provider interface 24, customer 18 and print provider 14 generate job ticket 40 and register printing capability 36, respectively. In one exemplary embodiment, as illustrated in FIG. 7, job ticket 40 includes a plurality of job ticket attributes 70 which define print job 16. Job ticket attributes 70 include, for example, a customer identification attribute 71, a file format attribute 72, a print medium size attribute 73a, a print medium type attribute 73b, a number of copies attribute 74, a printing quality option attribute 75, a printing layout attribute 76, a color printing option attribute 77, a finishing option attribute 78, and a delivery option attribute 79. Job ticket attributes 70 coincide with selections as specified in input fields 50 of customer interface 26.

Customer identification attribute 71 includes, for example, the name and the address of customer 18 as specified in customer identification filed 51 of customer interface 26. File format attribute 72 includes the format of the file from which print job 16 is to be printed as specified in file format field 52 of customer interface 26. Print medium size attribute 73a includes the size of medium upon which print job 16 is to be printed as specified in print medium size field 53a of customer interface 26. Print medium type attribute 73b includes the type of medium upon which print job 16 is to be printed as specified in print medium type field 53b of customer interface 26. Number of copies attribute 74 includes the number of copies included in print job 16 as specified in number of copies field 54 of customer interface 26. Printing quality option attribute 75 includes the printing quality of print job 16 as specified in printing quality option field 55. Printing layout attribute 76 includes the layout of how print job 16 is to be printed as specified in printing layout field 56 of customer interface 26. Color printing option attribute 77 includes whether print job 16 is to be printed in color as specified in color printing option field 57 of customer interface 26. Finishing option attribute 78 includes the finish to be applied to print job 16 as specified in finishing option field 58 of customer interface 26. Delivery option attribute 79 includes how and within what time frame print job 16 is to be delivered to customer 18 as specified in delivery option field 59 of customer interface 26.

In one exemplary embodiment, when data file 44 of print job 16 is submitted with job ticket 40, print managing system controller 28 infers or determines a number of job ticket attributes 70. Print managing system controller 28 determines, for example, file format attribute 72, print medium size attribute 73a, and printing layout attribute 76 of print job 16 from data file 44. Customer 18, therefore, need only enter those job ticket attributes 70 which are not determined by print managing system controller 28. As such, it is not necessary for a customer 18 to enter all job ticket attributes 70.

Figure 8:
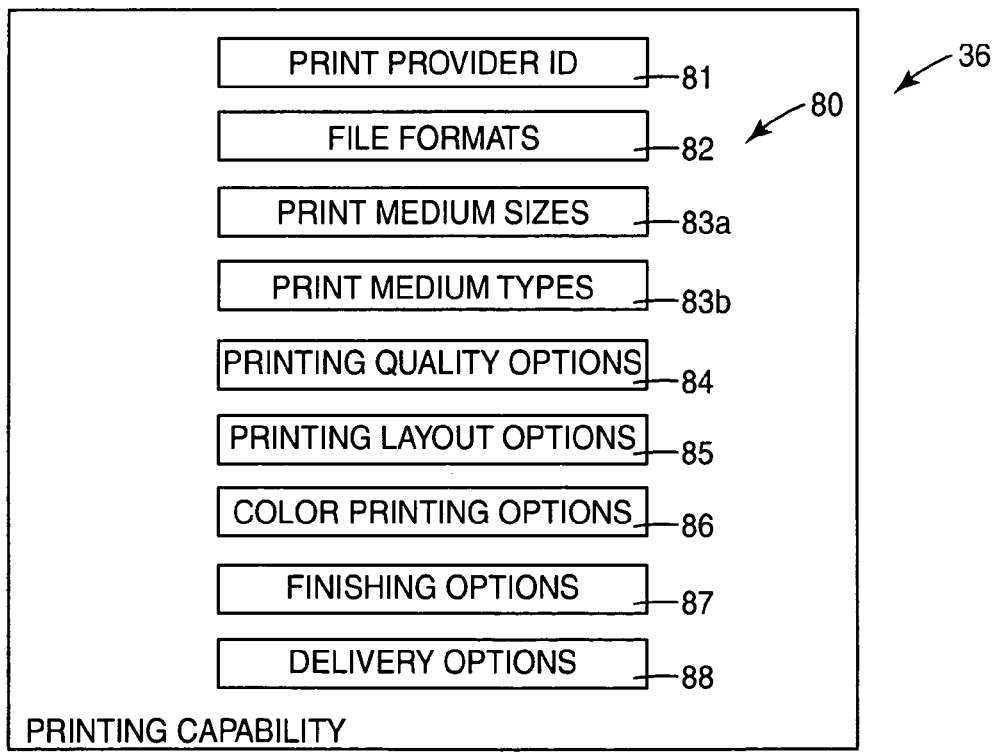
FIG. 8 is a diagram illustrating one exemplary embodiment of print services of a print provider registered with the print managing system of FIG. 1.

In one exemplary embodiment, as illustrated in FIG. 8, printing capability 36 includes a plurality of printing capability attributes 80 which define print services 12. Printing capability attributes 80, include, for example, a print provider identification attribute 81, a file formats attribute 82, a print medium sizes attribute 83a, a print medium types attribute 83b, a printing quality options attribute 84, a printing layout options attribute 85, a color printing options attribute 86, a finishing options attribute 87, and a delivery options attribute 88. Printing capability attributes 80 coincide with selections as specified in input fields 60 of print provider interface 24 in a manner similar to how job ticket attributes 70 coincide with selections as specified in input fields 50 of customer interface 26.

Figure 9:
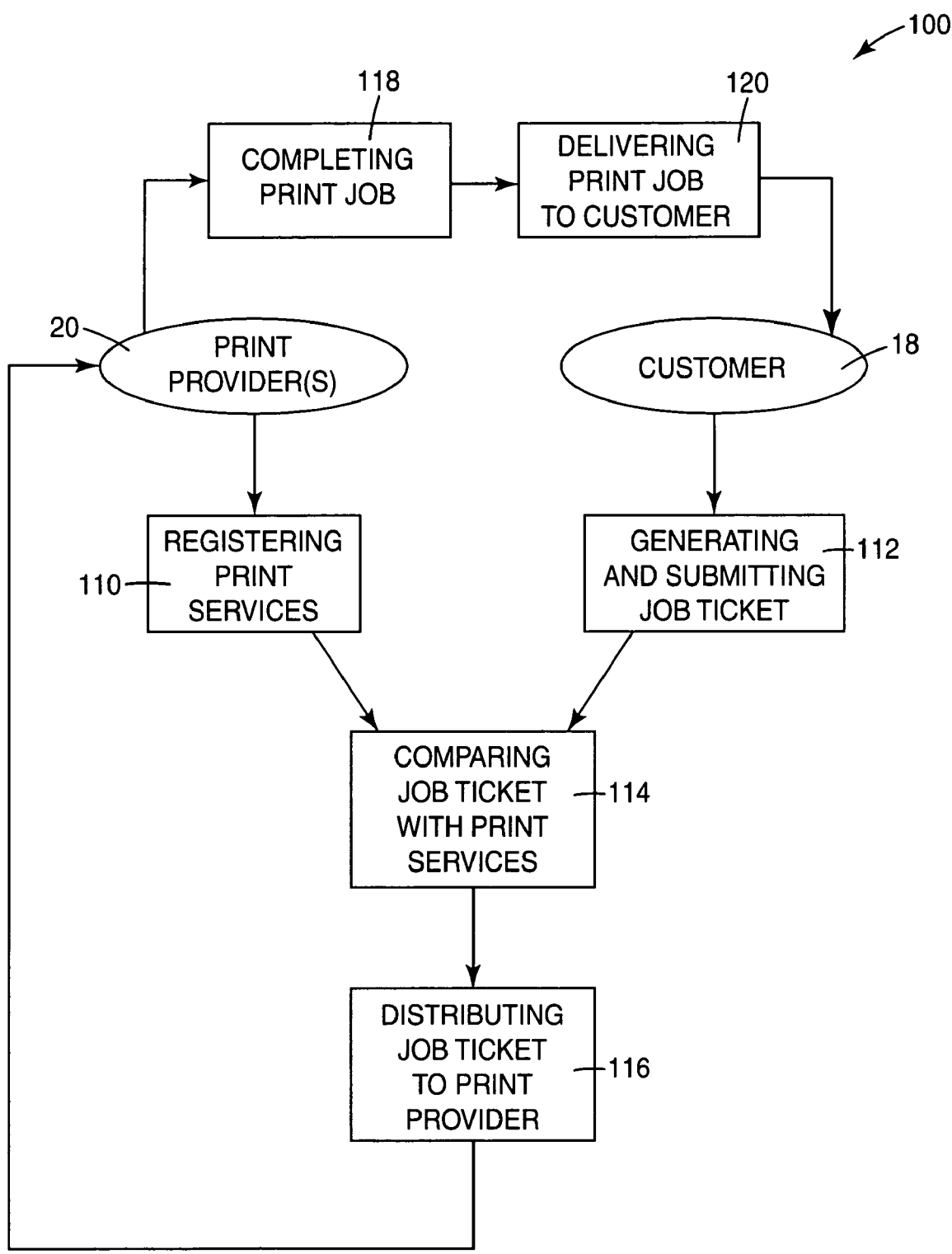
FIG. 9 is a flow diagram illustrating one exemplary embodiment of a method of managing print services of a print provider according to the present invention.

In FIG. 9, a flow diagram illustrating one exemplary embodiment of a method of managing print services 12 of print providers 20, including print job distribution according to the present invention, is illustrated generally at 100. Reference is also made to FIGS. 1-8. At step 110, at least one print provider 14 of the plurality of print providers 20 registers a respective printing capability 36 for print services 12 with print managing system controller 28 and, at step 112, customer 18 generates and submits job ticket 40 for print job 16 to print managing system controller 28.

In one exemplary embodiment, data file 44 for print job 16 is associated with job ticket 40 and submitted to print managing system controller 28 in step 112. Print providers 20 register printing capability 36 with print managing system controller 28 via print provider interface 24 and Internet communication link 32, as illustrated in FIG. 2 and described, and customer 18 generates and submits job ticket 40 to print managing system controller 28 via customer interface 26 and Internet communication link 32, as illustrated in FIG. 3 and described above.

Preferably, print providers 20 register printing capability 36 at step 110 before customer 18 generates and submits job ticket 40 at step 112. It is, however, within the scope of the present invention for print providers 20 to register printing capability 36 after customer 18 generates and submits job ticket 40. It is also within the scope of the present invention for print providers 20 to re-register and/or update printing capability 36 in print managing system controller 28, as described above. In addition, it is also within the scope of the present invention for customer 18 to re-generate and/or re-submit job ticket 40 to print managing system controller 28.

Next, in step 114, after print managing system controller 28 receives job ticket 40, print managing system controller 28 compares job ticket 40 of print job 16 with print services 12, including printing capability 36, of print providers 20 to determine if print provider 14 has print services 12 to fulfill print job 16.

To compare job ticket 40 with printing capability 36, job ticket attributes 70 of print job 16, as specified by customer 18, are compared with printing capability attributes 80 of print services 12, as provided by print providers 20. Thus, print providers 20 having printing capability 36 to fulfill job ticket 40 and, therefore, complete print job 16 are determined. Accordingly, only those print providers 20 which have printing capability 36 to fulfill job ticket 40 are identified in step 114.

When printing capability 36 of print providers 20 is registered with print managing system controller 28 in step 110, print managing system controller 28 stores printing capability 36 in print managing data storage system 42, as described above. As such, print managing system controller 28 retrieves printing capability 36 from print managing data storage system 42 when comparing job ticket 40 with printing capability 36 in step 114.

Next, in step 116, print managing system controller 28 distributes job ticket 40 for print job 16 to print provider 14 based on print provider 14 having printing capability 36 to fulfill print job 16, as determined in step 114. In one exemplary embodiment, print managing system controller 28 also distributes data file 44 for print job 16 to print provider 14 with job ticket 40.

Then, in step 118, print provider 14 completes print job 16 and, in step 120, delivers completed print job 16 to customer 18. Delivery of completed print job 16 to customer 18 from print provider 14 is also represented by dashed line 19 in FIG. 1.

Figure 10:
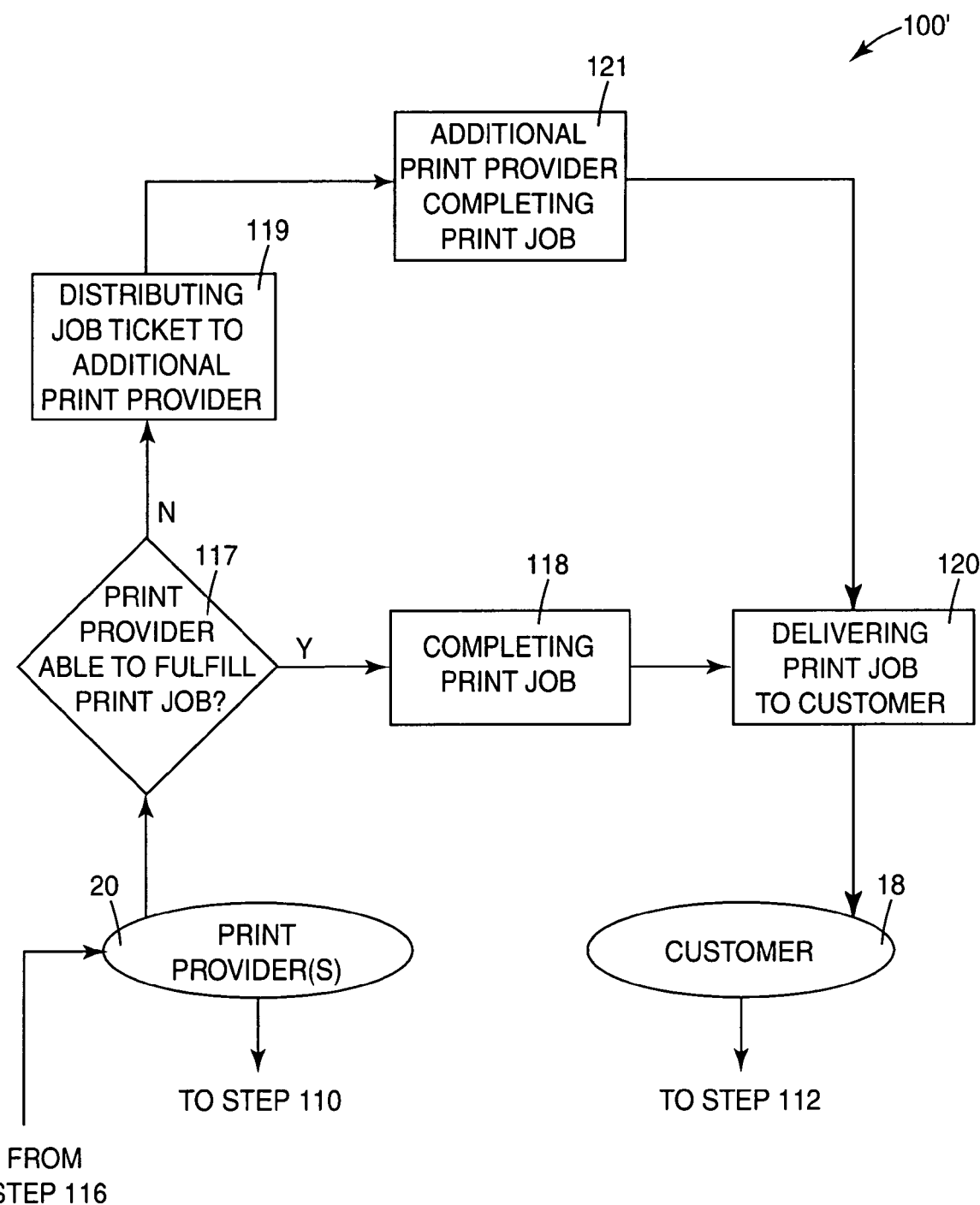
FIG. 10 is a flow diagram illustrating another exemplary embodiment of a portion of the method of FIG. 9.

In FIG. 10, a flow diagram illustrating a portion of a method of managing print services 12 of print providers 20 is illustrated generally at 100'. Method 100' represents another exemplary embodiment of a portion of method 100. As such, method 100' includes steps 110, 112, 114, and 116 of method 100 as illustrated in FIG. 9 and described above.

After print managing system controller 28 distributes job ticket 40 to print provider 14 in step 116, method 100' includes step 117. In step 117, whether print provider 14 is able to fulfill print job 16 is assessed. Print provider 14a, for example, may be unable to fulfill print job 16 if, for example, print provider 14a underestimated an ability to complete print job 16 and/or accepted print job 16 with an intention of subcontracting all or part of print job 16 to another print provider 14, such as print provider 14b.

If print provider 14 is able to fulfill print job 16, steps 118 and 120 are performed as outlined above. If, however, print provider 14 is unable to fulfill print job 16, either wholly or partially, step 119 is performed. In step 119, print managing system controller 28 reprocesses job ticket 40 and redistributes job ticket 40 as job ticket 40' to another or additional print provider 14. Transfer or redistribution of print job 16 and, more specifically, job ticket 40 from one print provider 14 to another print provider 14 is also illustrated in FIG. 4.

Next, in step 121, the other or additional print provider 14 completes print job 16. Then, in step 120, completed print job 16 is delivered to customer 18, as described above.

By registering printing capability 36 in print managing system controller 28, print providers 20 can optimize use of print services 12. More specifically, by registering and updating printing capability 36 in print managing system controller 28, print providers 20 can receive print jobs 16 requiring their respective print services 12 and/or distribute print jobs 16, either wholly or partially, to other print providers 20. Thus, print managing system 10 allows print providers 20 to essentially advertise print services 12 to customers 22 as well as other print providers 20. In addition, by defining Internet communication link 32 between print providers 20 and print managing system controller 28, print jobs 16 can be efficiently and automatically distributed to print providers 20.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of managing print services provided by a print provider, the method comprising:

defining a network communication link between the print provider and a print managing system controller;

presenting the print provider with a print provider interface, including presenting the print provider with input fields for specifying attributes of the print services provided thereby;

registering the print services provided by the print provider with the print managing system controller via the print provider interface and the network communication link, including specifying the attributes of the print services provided by the print provider with the input fields of the print provider interface;

receiving a job ticket for a print job at the print managing system controller;

determining via the print managing system controller if the print provider has the print services to fulfill the print job, including comparing the job ticket for the print job with the print services provided by the print provider; and distributing the job ticket for the print job to the print provider via the network communication link if the print managing system controller determines that the print provider has the print services to fulfill the print job.

2. The method of claim 1, wherein defining the network communication link includes defining an Internet communication link between the print provider and the print managing system controller, and wherein distributing the job ticket for the print job includes distributing the job ticket for the print job to the print provider via the Internet communication link.

3. The method of claim 1, wherein receiving the job ticket includes receiving the job ticket for the print job via the network communication link.

4. The method of claim 1, wherein receiving the job ticket includes receiving the job ticket for the print job from a customer.

5. The method of claim 4, wherein defining the network communication link includes defining the network communication link between the print provider, the customer, and the print managing system controller, and wherein receiving the job ticket includes receiving the job ticket for the print job from the customer via the network communication link.

6. The method of claim 1, wherein receiving the job ticket includes receiving the job ticket for the print job from another print provider.

7. The method of claim 6, wherein defining the network communication link includes defining the network communication link between the print provider, the other print provider, and the print managing system controller, and wherein receiving the job ticket includes receiving the job ticket for the print job from the other print provider via the network communication link.

8. The method of claim 1, wherein receiving the job ticket includes receiving at least one of a file format, a number of copies, a print medium, a printing layout, a printing quality option, a color printing option, a finishing option, a delivery option, and a customer identification for the print job.

9. The method of claim 1, further comprising:
associating a data file for the print job with the job ticket for the print job, wherein distributing the job ticket includes distributing the job ticket and the data file to the print provider via the network communication link.

10. The method of claim 1, further comprising:
tracking a status of the print job with the job ticket for the print job.

11. The method of claim 1, wherein registering the print services includes storing the print services provided by the print provider and wherein comparing the job ticket includes retrieving the print services provided by the print provider.

12. The method of claim 1, wherein registering the print services includes registering a printing capability of the print provider with the print managing system controller.

13. The method of claim 1, wherein registering the print services includes registering at least one of a file format compatibility, a print medium capability, a printing layout capability, a printing quality capability, a color printing capability, a finishing capability, a delivery capability, and an identification of the print provider.

14. The method of claim 1, wherein registering the print services includes updating the print services provided by the print provider when the print services provided by the print provider are modified.

15. The method of claim 1, wherein distributing the job ticket is performed by the print managing system controller.

16. The method of claim 1, wherein distributing the job ticket includes redistributing the job ticket for the print job to another print provider having print services to fulfill the print job when the print provider is unable to fulfill the print job.

17. The method of claim 1, further comprising:
completing the print job with the print services provided by the print provider, and
delivering the print job.

18. A system for managing print services provided by a print provider, the system comprising:
a print managing system controller; and
a print provider interface communicated with the print managing system controller, the print provider interface including input fields for specifying attributes of the print services provided by the print provider,
wherein the attributes of the print services provided by the print provider are specified with the input fields of the print provider interface and the print services provided by the print provider are registered with the print managing system controller via the print provider interface,
wherein the print managing system controller is adapted to receive a job ticket for a print job and compare the job ticket with the print services provided by the print provider to determine if the print provider has the print services to fulfill the print job, and
wherein the print managing system controller is adapted to distribute the job ticket for the print job to the print provider if the print managing system controller determines that the print provider has the print services to fulfill the print job.

19. The system of claim 18, wherein the print managing system controller is adapted to track a status of the print job with the job ticket for the print job.

20. The system of claim 18, wherein the print managing system controller is configured to communicate with the print provider via a network communication link, and wherein the print managing system controller is adapted to distribute the job ticket for the print job to the print provider via the network communication link.

21. The system of claim 20, wherein the network communication link is an Internet communication link.

22. The system of claim 18, wherein the print managing system controller is adapted to receive the job ticket for the print job via a network communication link.

23. The system of claim 22, wherein the network communication link is an Internet communication link.

24. The system of claim 18, wherein the print managing system controller is adapted to receive the job ticket for the print job from a customer.

25. The system of claim 24, wherein the print managing system controller is configured to communicate with the customer via a network communication link, and wherein the print managing system controller is adapted to receive the job ticket for the print job from the customer via the network communication link.

26. The system of claim 25, wherein the network communication link is an Internet communication link.

27. The system of claim 18, wherein the print managing system controller is adapted to receive the job ticket for the print job from another print provider.

28. The system of claim 27, wherein the print managing system controller is configured to communicate with the other print provider via a network communication link, and wherein the print managing system controller is adapted to receive the job ticket for the print job from the other print provider via the network communication link.

29. The system of claim 28, wherein the network communication link is an Internet communication link.

30. The system of claim 18, wherein the job ticket for the print job includes at least one of a file format, a number of copies, a print medium, a printing layout, a printing quality option, a color printing option, a finishing option, a delivery option, and an identification for the print job.

31. The system of claim 18, wherein the print managing system controller is adapted to receive a data file for the print job, and wherein the print managing system controller is adapted to distribute the job ticket and the data file to the print provider via a network communication link.

32. The system of claim 31, wherein the network communication link is an Internet communication link.

33. The system of claim 18, wherein the print services provided by the print provider are registered with the print managing system controller via the print provider interface and a network communication link.

34. The system of claim 33, wherein the network communication link is an Internet communication link.

35. The system of claim 18, further comprising:
a print managing data storage system configured to communicate with the print managing system controller, wherein the print managing system controller is adapted to store a registration of the print services provided by the print provider in the print managing data storage system.

36. The system of claim 18, wherein the print services provided by the print provider include a printing capability of the print provider.

37. The system of claim 36, wherein the printing capability of the print provider includes at least one of a file format capability, a print medium capability, a printing layout capability, a printing quality capability, a color printing capability, a finishing capability, a delivery capability, and an identification of the print provider.

38. The system of claim 18, wherein the print services provided by the print provider are updated in the print managing system controller when the print services provided by the print provider are modified.

39. The system of claim 18, wherein the print managing system controller is adapted to redistribute the job ticket for the print job to another print provider having print services to fulfill the print job when the print provider is unable to fulfill the print job.

* * * * *

UNITED STATES PATENT AND TRADEMARK OFFICE
CERTIFICATE OF CORRECTION

PATENT NO.         : 7,242,490 B1
APPLICATION NO.    : 09/685847
DATED              : July 10, 2007
INVENTOR(S)        : Donald J. Palmer et al.

It is certified that error appears in the above-identified patent and that said Letters Patent is hereby corrected as shown below:

In column 14, line 10, in Claim 17, after "provider" delete "," and insert -- ; --, therefor.

Signed and Sealed this

Eleventh Day of August, 2009

David J. Kappos
*Director of the United States Patent and Trademark Office*